(12) United States Patent
Kastalsky (10) Patent No.: US 6,288,824 B1
(45) Date of Patent: Sep. 11, 2001

(54) DISPLAY DEVICE BASED ON GRATING ELECTROMECHANICAL SHUTTER

(76) Inventor: Alex Kastalsky, 3 Kenneth Dr., Wayside, NJ (US) 07712

( * ) Notice: Subject to any disclaimer, the term of this patent is extended or adjusted under 35 U.S.C. 154(b) by 0 days.

(21) Appl. No.: 09/270,614

(22) Filed: Mar. 17, 1999

Related U.S. Application Data (63) Continuation-in-part of application No. 09/184,886, filed on Nov. 3, 1998, now abandoned.

(51) Int. Cl.$^7$ ...................................................... G02F 1/07
(52) U.S. Cl. ........................ 359/254; 359/291; 359/295; 359/298; 359/290
(58) Field of Search .................................. 359/254, 259, 359/320, 298, 290, 291, 233, 295

(56) References Cited

U.S. PATENT DOCUMENTS

| | | | | |
|---|---|---|---|---|
| 4,385,798 | * | 5/1983 | Yevick ................................. | 359/290 |
| 4,753,517 | * | 6/1988 | Samek ................................. | 359/254 |
| 5,260,719 | * | 11/1993 | Maloney ............................. | 359/254 |
| 5,629,794 | * | 5/1997 | Magel et al. ........................ | 359/290 |
| 5,745,281 | * | 4/1998 | Yi et al. .............................. | 359/290 |

* cited by examiner

*Primary Examiner*—Loha Ben
(74) *Attorney, Agent, or Firm*—Charles I. Brodsky (57) ABSTRACT

Electrostatic optical shutter is disclosed in which a resilient electrode in the shape of a membrane made from optically transparent and electrically insulating film is disposed over an optically transparent and electrically insulating substrate and supported by one or several flexible tether beams which are attached to the substrate through the conductive pillars. Both the membrane and the substrate contain a grating with periodically repeated parallel stripes made from electrically conductive and opaque material. The stripes are connected at one or both ends to form continuous electrodes, while the grating structures on the electrodes are shifted from each other by a half a period to block the light transmission through the shutter in the unbiased state. Under electrical bias, the membrane is moved both laterally and normally to the substrate, which results in a spatial alignment of the conductive stripes in both grating structures and formation of the openings in the shutter for the light transmission. A flat panel display having video and color capabilities and comprising two-dimensional matrix of such shutters is disclosed. To implement passive matrix driving architecture, each pixel of the display contains a thin-film diode and a thin-film resistor to eliminate cross talk between the pixels. Both the transmissive and reflective modes of the display operation are proposed. A sequential pulsed illumination with the light emitting diodes of three major colors is used to produce the color in the display. Another approach in making a flat panel display, capable of operating in both transmissive and reflective mode, is disclosed in which two-terminal electrical control of the pixels produces effect of bistability in positioning of the membrane relative to the substrate and thereby provides a memory effect, which allows one to hold the "on"-state of each pixel for almost the entire frame time and thus increase the display brightness.

17 Claims, 10 Drawing Sheets

Fig.10

DISPLAY DEVICE BASED ON GRATING ELECTROMECHANICAL SHUTTER

CROSS-REFERENCE TO RELATED APPLICATIONS

This application is a continuation /in part/ of application Ser. No. 09/184,886, filed Nov. 3, 1998, now abandoned.

STATEMENT REGARDING FEDERALLY SPONSORED RESEARCH AND DEVELOPEMENT

Not Applicable.

REFERENCE TO A MICROFICHE APPENDIX

Not Applicable.

BACKGROUND OF THE INVENTION a. Field of the Invention

The present invention relates to the optical shutter and more particularly, to the flat panel electrostatic display device having a twodimensional array of these shutters; each shutter contains electrically actuated membrane supported by a resilient beam which allows the membrane to move over fixed electrodes on the substrate and thereby modulate transmission and reflection of the incoming light.

b. State of the Prior Art

The electrostatic optical modulator employing a resilient electrode moving over a static electrode has been a subject of many patents and publications. The difference between them originates essentially from the shape of electrodes involved and the direction of movement of the flexible electrode relative to the static one. There are several patents on the electrostatic modulators and displays in which the flexible electrode moves to a curved static electrode thus providing an opening for the light transmission, see e.g. U.S. Pat. No. 4,229,075. Other approaches use an originally curved membrane film which then flattens as the membrane electrostatically moves toward the fixed electrode and thus modulates the light, see e.g. U.S. Pat. Nos. 4,208,103 and 4,786,149.

Various examples of the electrostatic optical shutters are based on the field induced bending of a cantilever membrane which is moved toward a flat static electrode thereby changing the optical state, see U.S. Pat. Nos. 3,553,364, 3,600,798, 4,229,732, 4,731,670 and 5,781,331. Another approach relies on an electrostatically induced twisting of the membrane mirror from its initial flat position to vary the optical reflection, see U.S. Pat. Nos. 3,746,911 and 4,710,732. This electrostatic modulator, known as the Deformable Mirror Device, has been reduced to practice as a commercially available projection display, see e.g. L. J. Hombeck "128× 128 deformable mirror devices", IEEE Trans.on Electr. Dev., ED-30, p.539,1983, and D. R. Pape and L. J. Hombeck "Characteristics of the deformable mirror device for optical information processing", SPIE 388, p.65, 1983.

Of background interest are also the optical modulators in which electrically actuated membrane displacement changes the conditions of the optical resonance existing between the membrane and the substrate, thus varying the state of optical reflection, see K. W. Goossen et al. "Silicon modulator based on mechanically active antireflection layer with 1 Mbit/sec capability for fiber-on-the-loop applications", IEEE Phot-.Techn. Lett. 6,1119,1994; and O. Solgaard et al., "Deformable grating optical modulator", Optics Letters, 17, p.688, 1992.

OBJECTS AND SUMMARY OF THE INVENTION

It is a general object of the present invention to introduce a new, fast and cost effective electrically actuated electromechanical optical shutter.

Another object of the present invention is to provide a flat panel display in which these shutters compose an electrically controlled two dimensional array of pixels.

Yet another object of the present invention is to provide a detailed description of the operation, fabrication and performance of the proposed flat panel display.

According to the present invention, the optical shutter (or the display pixel) consists of a membrane disposed over and attached to an optically transparent and electrically insulating substrate through one or two long and narrow tether beams. The membrane, separated from the substrate by an air gap, is made as a film of electrically insulating and optically transparent material. Both the membrane and the substrate are identically coated with an opaque and electrically conductive film in the shape of parallel and periodically repeating stripes, occupying the entire optically active area of the shutter. The stripes on each element of the shutter are connected at one or both ends, thereby providing two separate continuous electrodes facing each other over a narrow air gap. The opaque stripe in each period of the grating structure is wider than the opening, while the grating structure in the membrane is shifted by a half a period relative to that in the substrate. This implies that when no voltage is applied, the combined grating structure of both electrodes completely blocks the light ("off"-state).

Upon application of the voltage between the electrodes, the membrane is attracted to the substrate. The key factor is that the membrane moves to its most energetically favorable position in which the conducting opaque stripes spatially coincide on both electrodes. In this case, the combined stripe structure of two electrodes contains periodically repeating openings and therefore passes the light ("on"-state). In the shutter designed for the display application, the total length of the membrane movement, both laterally (half a period) and toward the substrate, can be made as small as a few microns. This provides a high modulation speed at a moderate voltage amplitude. To minimize the air drag, the membrane film is etched away within the openings. As shown below, for realistic dimensions of the membrane and the stripe structure, the "off"-to-"on"switching time can be made in the range of ~1 μs for a suitable for the display operation voltage amplitude of 10V.

According to the present invention, two-dimensional array of the shutters comprises the display capable of operating in both transmissive and reflective optical modes. Simple passive matrix architecture with rowby-row pixel addressing can be utilized. To prevent inter-pixel cross talk, inevitably existing in the passive matrix scheme, a resistor is connected in parallel to the shutter, to lower the pixel impedance, while the shutter-resistance circuit is connected in series with a diode. Such a combination prevents formation of parasitic conductive loops over the display matrix. Both the resistor and the diode are made as thin films. The amorphous Si as a material for these films is preferable.

Two different pixel designs are considered according to the present invention. The first and simple case relates to a twoterminal pixel configuration operating with only one controlling voltage. The second design employs a threeterminal approach operating with two controlling voltages to provide a bistability for the membrane position relative to the substrate. In the first configuration, the pixel transmits or reflects light only during a short period of time, defined by the row addressing time $t_r$, plus some time $t_m$ needed for the membrane to return to its original "off" state position under elastic force of the tether beam as the voltage is reduced to zero. The time tr is controlled by the frame time tf and the number of the rows N: $t_r=t_f/N$. In the second, three-terminal case, due to bistability effect, the membrane remains in the "on"-state during the entire frame time (per color), which increases the pixel brightness.

In both approaches considered, the color can be implemented by subdividing the frame time into three periods for three main colors. For each color, light emitting diodes (LED) can be used for pulsed illumination. Short pixel switching time allows realization of the gray levels through repetition of the "on"-"off" switching procedures within the row addressing time for the two-terminal pixel structure and within the entire frame time for the three-terminal configuration.

BRIEF DESCRIPTION OF THE DRAWINGS

The FIGS. 1–6 relate to the two-terminal pixel structure, while FIGS. 7–10 describe the three-terminal approach.

DETAILED DESCRIPTION

Figure 1:
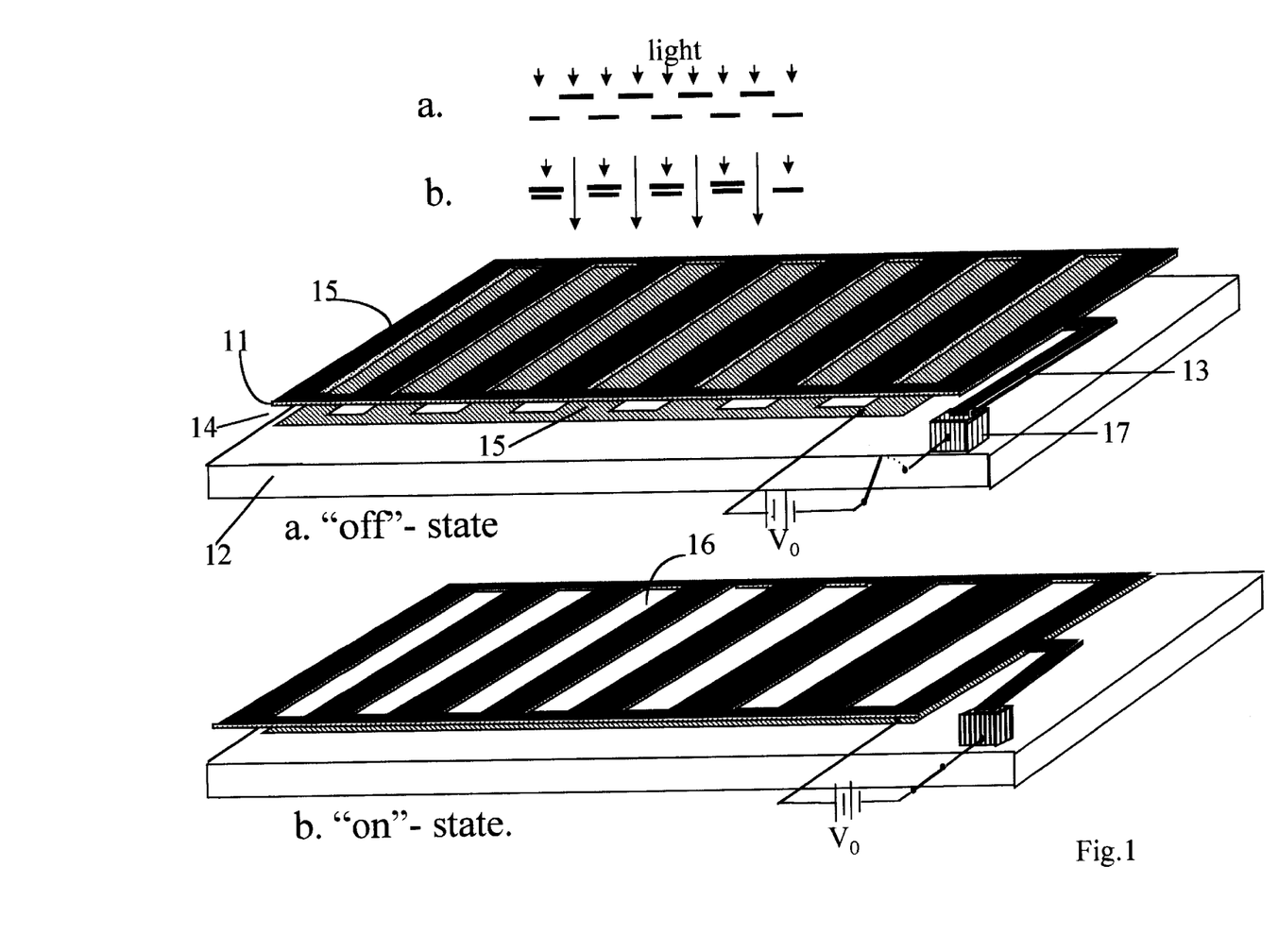
FIG. 1 illustrates the mechanism of the two-terminal optical modulation of the shutter for the transmissive mode.

Referring to FIG. 1, a physical principle of the shutter/pixel modulation of the transmitted light, is schematically illustrated. The shutter consists of two basic elements, namely, the membrane 11, made from a film of electrically insulating and optically transparent material, such as $SiO_2$, and the optically transparent substrate 12, such as glass, to which the membrane is attached through the long and narrow tether beam 13. The latter is made from the same material as the membrane 11 and contains a conductive film to provide an electrical contact to the membrane grating structure. The tether beam 13 holds the membrane 11 essentially parallel to the substrate 12 and separated from the substrate by a few micron-wide air gap 14. This gap is provided by an electrically conductive pillar 17 to which the tether beam is attached. The tether beam flexibility allows electric field induced displacement of the membrane both toward the substrate and laterally.

Both the membrane 11 and the substrate 12 are coated with a film of opaque and electrically conductive material, such as metal, in the shape of multiple and periodically repeated parallel stripes 15, occupying the entire active shutter area. The opaque stripe 15 is made wider than the opening 16 between the stripes. The stripes are connected together at one or both ends of the structure thereby forming continuous grating electrodes on both planes of the shutter. The insulating film in the membrane 11 is etched away in the opening spaces 16 of the grating to provide holes in the membrane and thus minimize an air drag for the membrane vertical move. The grating structure in the membrane is shifted by half a period from the substrate structure, so that the opening in either of the shutter electrodes is located in front of the opaque stripe in its counterpart, as shown in FIG. 1a. This implies that the resultant combined stripe structure completely blocks the light, thus establishing the "off"-state of the shutter. The membrane conducting film 15 also covers the tether beam 13 and is electrically connected to the pillar 17 which is connected to the pixel control circuit.

Upon application of the voltage to the membrane relative to the substrate, the membrane moves toward the substrate vertically. At the same time, it shifts laterally to occupy the most energetically favorable position at which the conducting stripes on both electrodes coincide, as shown in FIG. 1b. This results in appearance of periodic openings in the combined structure, thereby providing the uonw state of the shutter. Both these states are schematically illustrated in the top sketch of FIG. 1. As the voltage is reduced to zero, the membrane returns to its original off-state position due to elastic force of the tether beam.

It is obvious that the optical fill factor of the proposed pixel design is always less than 50%, and the output light intensity in the range of 30–40% from its initial illumination intensity seems achievable. This value is higher than that in the Liquid Crystal Display (LCD) where this factor is typically less than 10%.

To estimate the "off"-to-"on" switching time, one can use Newton equation:

$$dx/dt=F/m \cdot t, \quad (1)$$

where the electric force $F=(E^2/8\pi) \cdot \Delta S$, E is the electric field, $\Delta S$ is the effective grating film area and m is the membrane mass. Using $\Delta S=\frac{1}{2}\times 100\times 100$ $\mu m^2$ one obtains for the average density of 2.3 g/cm$^3$ and the total distance of the membrane displacement L=4 $\mu$m, the time of the "off"-"on" switch $t_s$:

$$t_s=\{(16\pi m L^3)/(3V^2\Delta S)\}^{1/2}\approx 10 \; \mu s \cdot 1/V_0(\text{volts}). \quad (2)$$

For the applied voltage of $V_0$ 10 V one obtains the switching time of ~1 $\mu$s. For the sake of estimates, in this calculation only electrical component of the force is taken into account, while the elastic force of the membrane holder as well as the force of air resistance were neglected. The air drag plays a significant role in the vertical membrane movement. This is why the pixel processing, according to the present invention, includes etching of the membrane film in the grating openings. The experiments with a similar membrane (see O.Solgaard et al.," Deformable grating optical modulator", Optics Letters, 17, p.688, 1992) yielded the membrane frequency response in excess of 2 MHz, which is equivalent to 0.5 $\mu$s switching time. This value must be compared with the row addressing time $t_r$. For 1000 rows in the display and 33 ms frame time, $t_r$=33 $\mu$s (11 $\mu$s per color). If dual addressing scheme is applied, at which each half of the screen is addressed separately, the pixel addressing time is doubled.

When voltage $V_0$ is removed, the membrane returns back to the "off"-state only under a relatively small elastic force of the tether beam, which depends on the elasticity of the beam material (such as SiO$_2$) and the beam geometry. The estimates show that with appropriate choice of the beam dimensions the return time $t_m$ can be made within the range $t_r > t_m > t_s$. This delay of the "on"-"off" switching process is beneficial for the display performance since it provides some extra time for illumination. More detailed discussion of the shutter transient processes will be done later in reference to FIG. 5.

Thus, the pixel "off"-to-"on" switching time $t_s$ is well below the row addressing time $t_r$, which in turn is $10^3$ times smaller than the frame time $t_f$:

$$t_s \ll t_r \ll t_f \qquad (3)$$

Small "off-on" switching time warrants a high quality video signal display operation, unlike the LCD in which this time is comparable with the frame time and thus limits the video signal processing.

Figure 2:
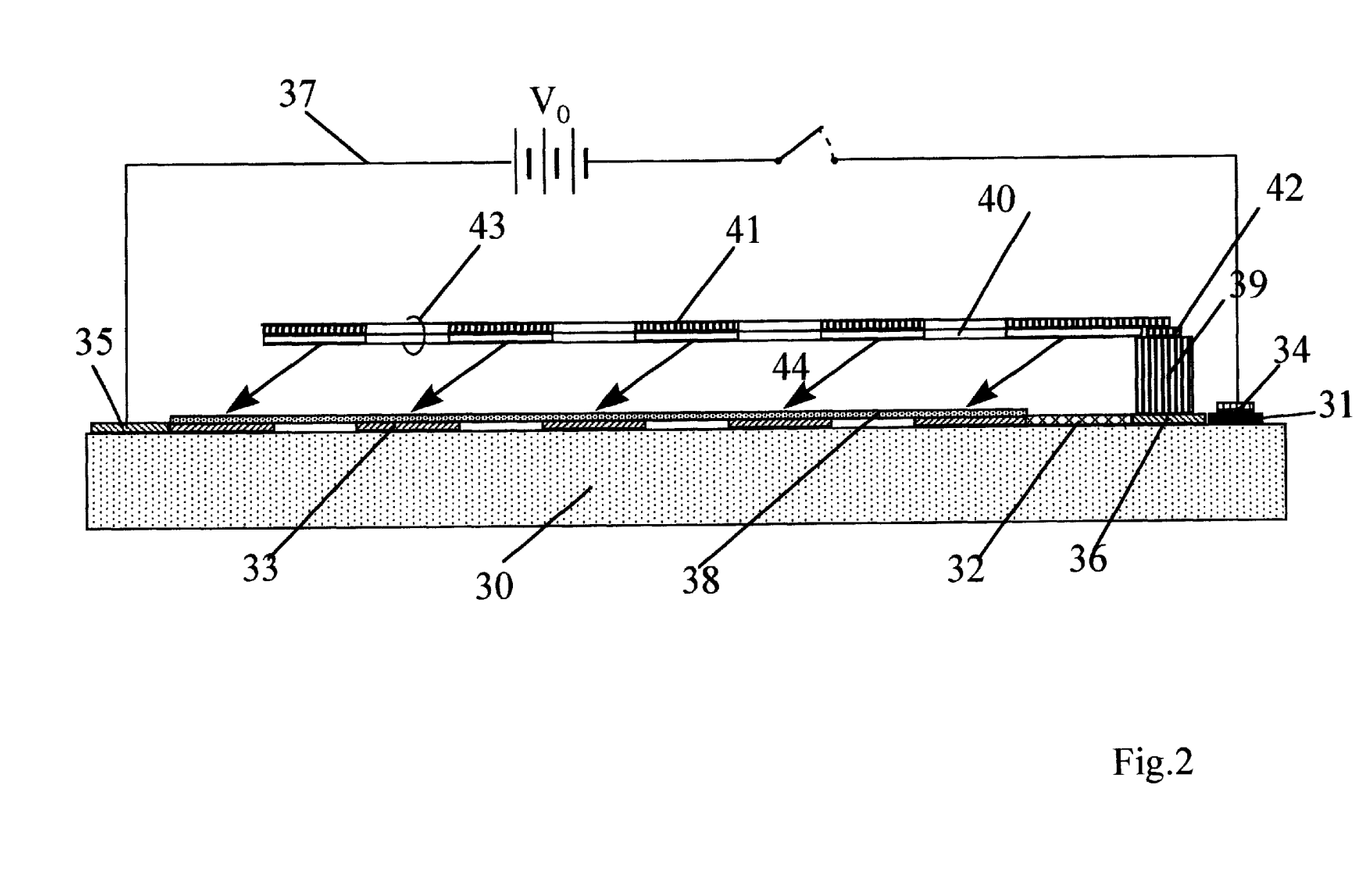
FIG. 2 shows a side view of the shutter structure.

FIG. 2 shows the side view of the shutter, having the layer structure according to the preferred embodiment for the case when only one tether beam is used (as shown in FIG. 1). The discussion of the layer structure will be given simultaneously with the main processing steps of the shutter fabrication. The fabrication starts from deposition on the glass substrate 30 of a thin-film diode 31 and a thin-film resistor 32. Amorphous silicon is the preferred material for fabrication of these two elements. More detailed description of the pixel driving circuit will be given later in reference to FIG. 4. It is followed by deposition on the substrate of row and column metal lines. The row line film consists of two parts: the metal grating electrodes 33 and the small metal bridges 35 between the grating structures in one row. The column line 34 is connected to the diode 31, the grating 33 is connected to the resistor 32, while the metal film 36 connects the diode and the resistor to the pixel driving circuit 37 through the column line 34. An insulating film of SiO$_2$ 38 is then deposited on top of the structure, with an opening at the metal film 36.

To fabricate the membrane as well as provide a contact to the membrane, a metal pillar 39, 2–3 μm high, is grown on the film 36. Then a sacrificial layer (not shown), 2–3 μm thick, is deposited on the substrate. The polyimide is the most appropriate material for this layer. It is coated with an insulating and membrane supporting SiO$_2$ layer 40. It is followed by deposition of the metal grating film 41, together with the metal contact 42 on the tether beam between the pillar 39 and the grating 41. After patterning of the top SiO$_2$ layer 40, to define the membrane 43 and the tether beam, the membrane release is accomplished by removing the sacrificial layer. The described above processing is standard and relatively simple for the micro-electro-mechanical technology based on deposition of the sacrificial layers and subsequent their removal.

Figure 3:
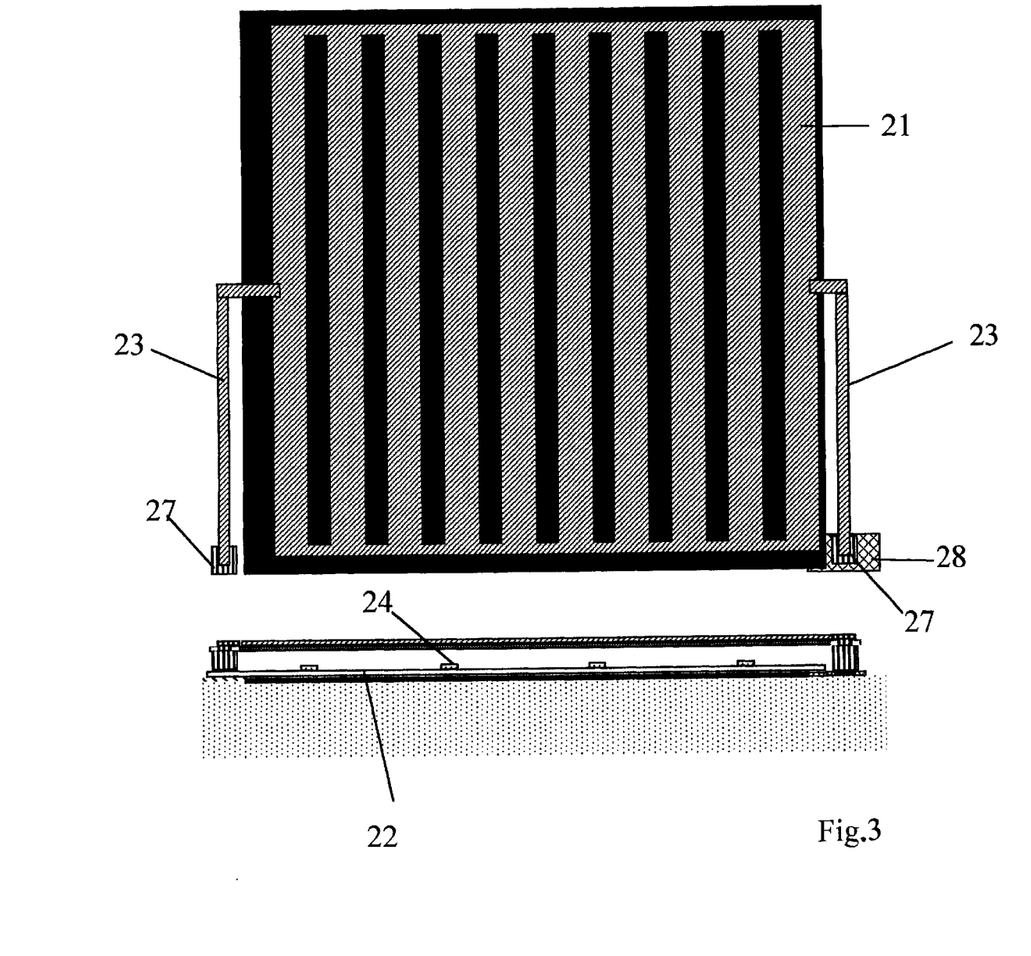
FIG. 3 shows the shutter with two tether beams.

The modified version of the shutter/pixel is shown in FIG. 3. The top view shows two tether beams 23 attached to the membrane 21 to enforce the mechanical strength of the modulator. The beams are attached to the conducting pillars 27 supporting the membrane 21. One of the pillars (on the right side in FIG. 3) is electrically connected to the pixel electrical circuit 28, while another pillar is electrically isolated. The side view at the bottom of FIG. 3 schematically shows a few additional small pillars 24 which are deposited on the insulating layer 22 on top of the substrate structure. These pillars are introduced to prevent possible membrane "sticking" to the substrate in the "on"-state.

Figure 4:
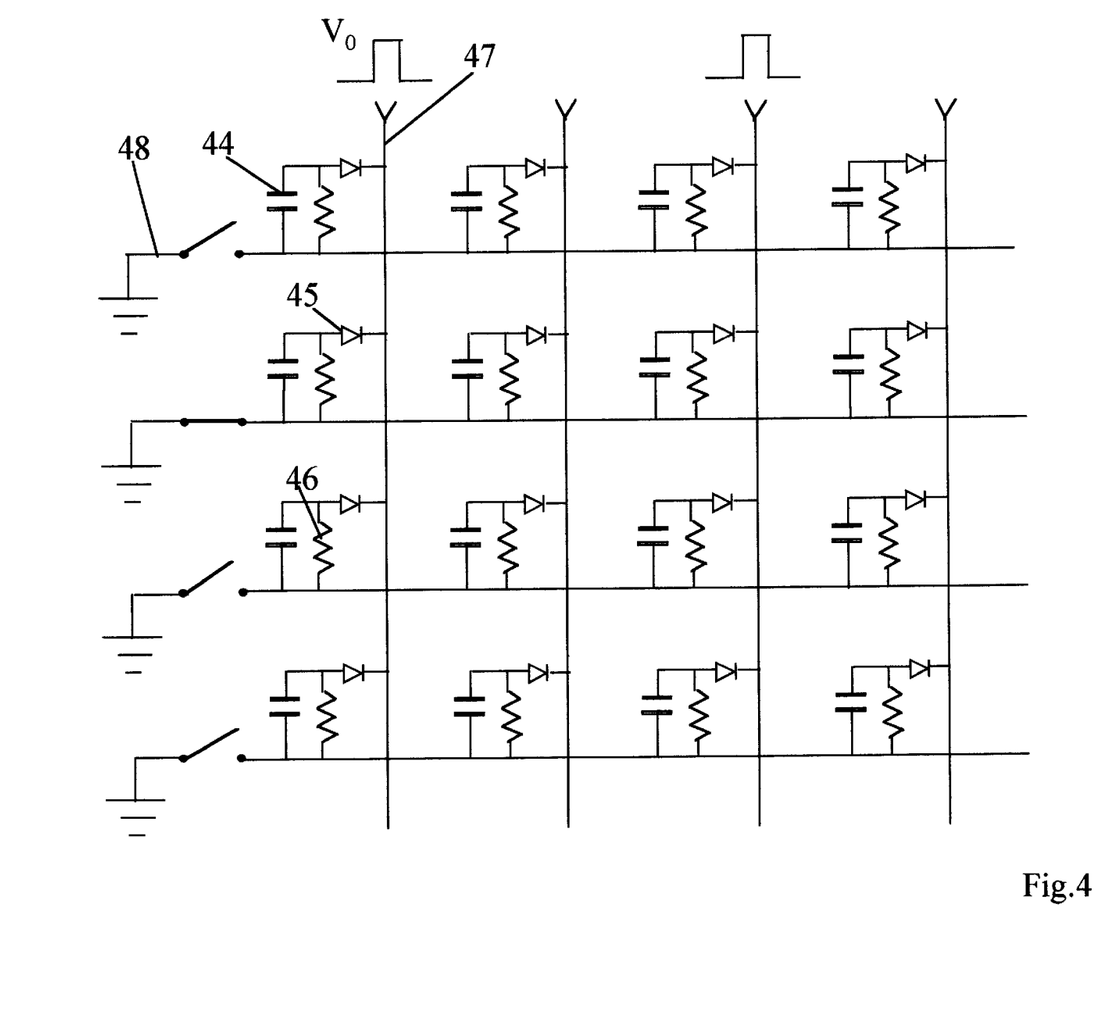
FIG. 4 shows the display matrix.

FIG. 4 illustrates twodimensional array of the shutters forming the proposed display. Each pixel of the display contains the shutter 44 and two thin-film elements, 45 and 46, needed to implement passive matrix architecture which is the simplest display driving scheme. In this scheme, the information signal reaches the pixels in one row in parallel, while the rows are enabled in series by sequential grounding of the row lines. The diode 45 and the resistor 46 comprise a series circuit connecting the column 47 and the row 48 lines, while the resistor 46 is in parallel to the shutter 44. The diodes, which are forward biased in each selected pixel, eliminate the cross-talk between the pixels. Without the diodes, the passive matrix approach results in formation of multiple circuit loops surrounding each pixel. The diodes block the currents in these loops and provide selective pixel addressing in the array. To realize this approach, the reverse biased diode resistance $R_d$ must be larger than the shutter resistance. The role of the parallel resistor 46 is to reduce the total shutter resistance $R_d$ well below the $R_d$. Having $R_s$=1 Mohm, which is much smaller than the $R_d$ of the reverse biased thin-film diode, one can estimate the power $P_d$ needed to drive the display. For $V_0$=10V and 1000×1000=$10^6$ pixels, the total power for the case when all the pixels are charged is:

$$(V_0^2/R_s) \times 1000 = 0.1W. \qquad (4)$$

This value does not include the power consumed by the driving electronics and the display illumination. However, since, as discussed earlier, the absorption of light intensity in the proposed display is significantly smaller than that in the LCDs, one can expect the total power consumption to be proportionally lower than in the LCD with the same pixel density.

Figure 5:
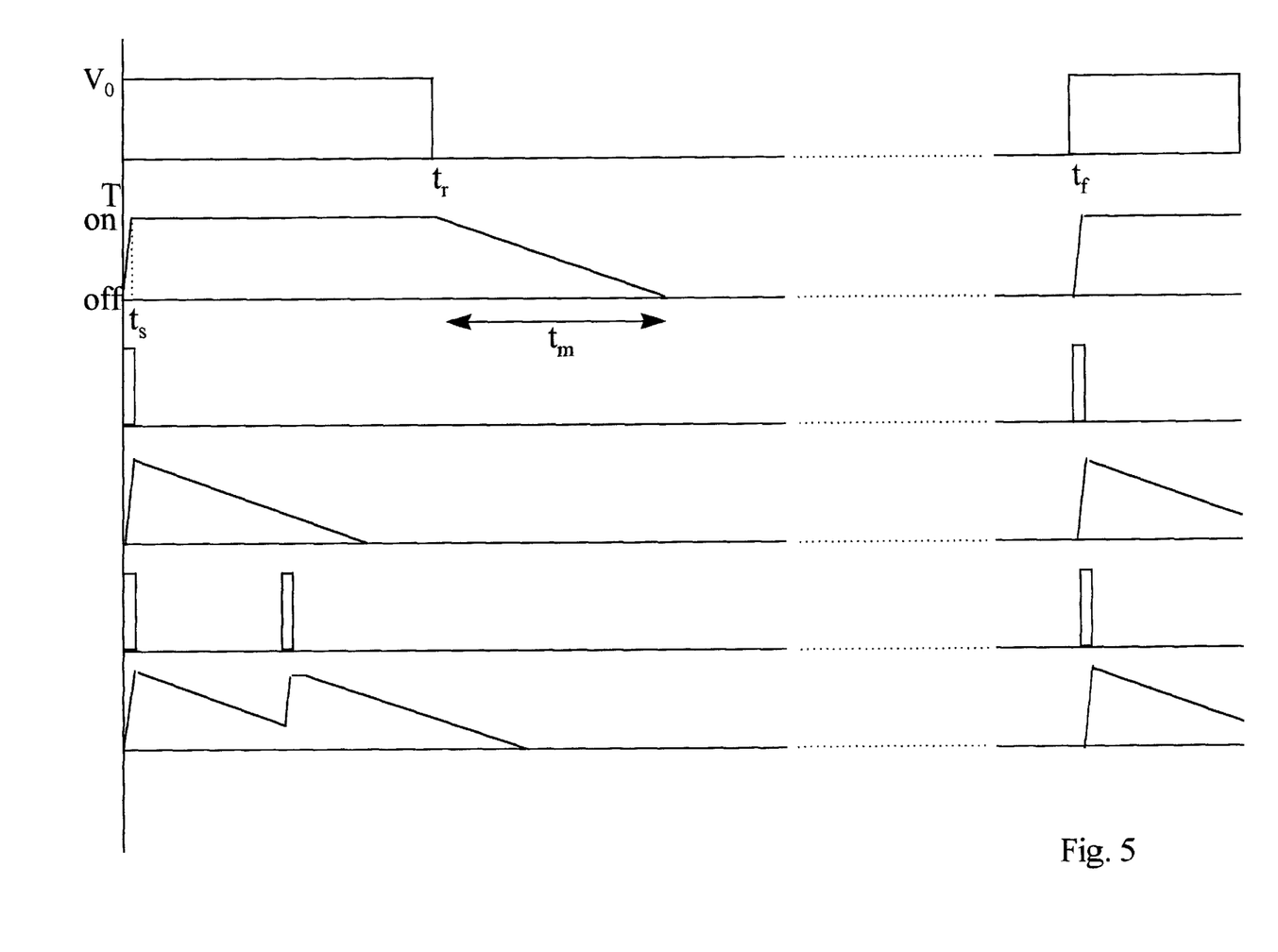
FIG. 5 shows transient characteristics of the optical modulation of the shutter for the two-terminal pixel structure.

FIG. 5 shows a sketch of transient characteristics of the display, when the two-terminal approach is used. The top trace shows the row addressing pulse of duration $t_r$. The second trace demonstrates the optical response: fast rise of the optical transmission T during the shutter switching time $t_s$ and a relatively long decay after $t=t_r$ determined by the membrane return time $t_m$.

To produce the gray levels, a different driving scheme is proposed. The pixel is driven by short multiple pulses of duration $t_s$. The number of pulses within the row addressing time $t_r$ determines the gray level. Four last traces in FIG. 5 show the results for one and two such pulses of the amplitude $V_0$ and the respective curves of the modulation of light intensities. Increase of the number of pulses changes the pixel gray level from dark to bright.

As mentioned above, three basic colors sequentially produced during the frame time by three pulsed light sources, provide the display color. Light emission diodes of red, green and blue color are the preferred embodiment. This method is particularly attractive for high resolution display applications, since each pixel is used for three different colors, while in the LCD operation three different pixel arrays, with appropriate filters, are used to form a colored image, which reduces the display resolution. The alternative and more complex driving scheme of the proposed display can be realized by using active matrix approach, with a capacitor and transistors existing in each pixel cell, as in modem LCD's. This will allow one to increase the screen luminosity by storing the signal and keeping the pixel in the "on" state for almost entire frame time per color, i.e. ⅓ of the total frame time. As in the discussed above passive matrix scheme, the gray levels in this case can be implemented by applying short pulses to the membrane.

The above discussed shutter/pixel structure and device processing were designed for the transmissive mode of the display operation when the light passes through the structure. On the other hand, another, reflective, display mode can also be implemented. To enhance reflectance, an additional light reflecting layer, like a metal film, is disposed over the substrate underneath the substrate grating film. The reflecting mode allows operation in an ambient light, with no external illumination. This can be beneficial for the applications in which very low power dissipation is required, such as portable communication appliances.

Figure 6:
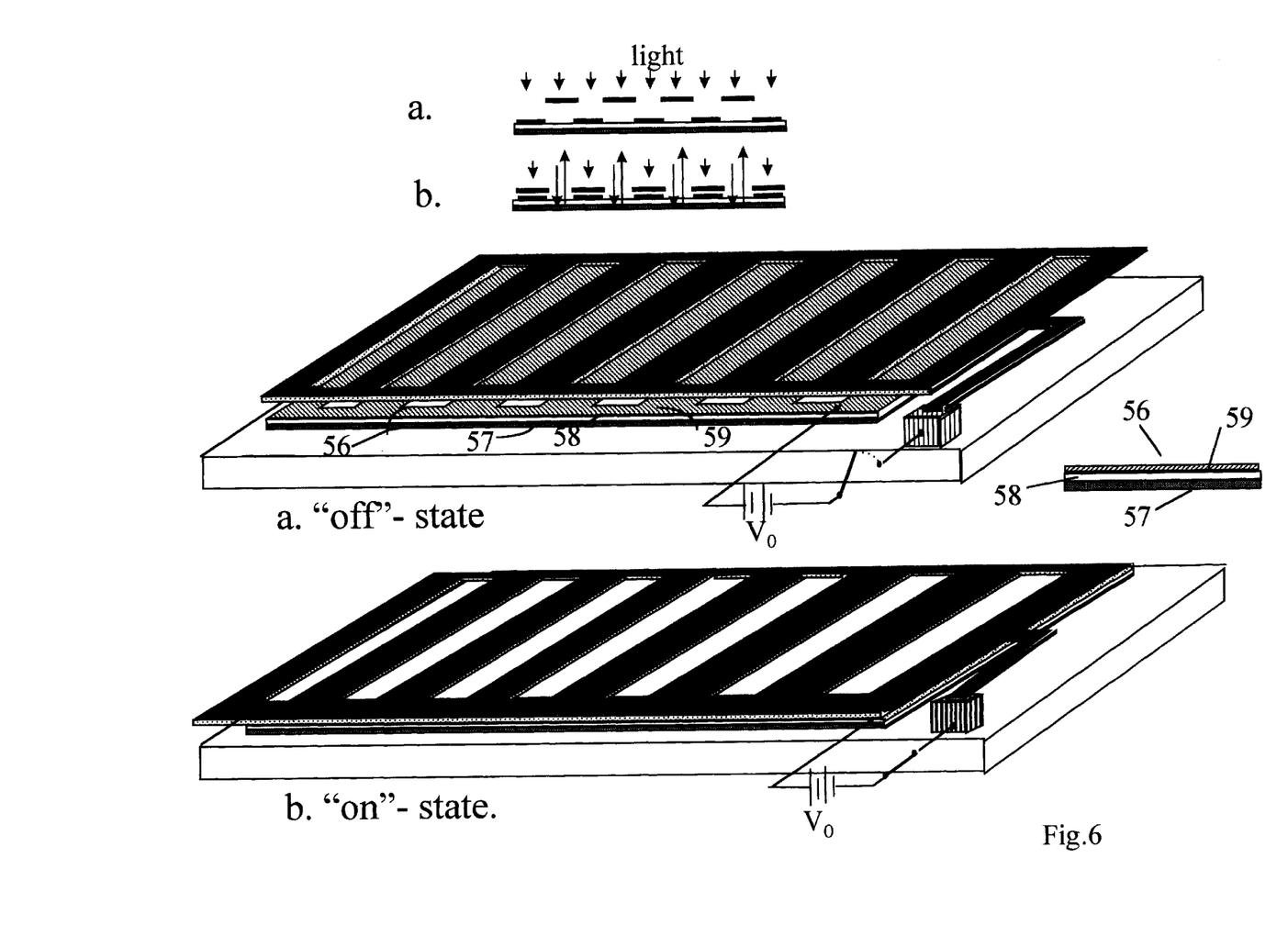
FIG. 6 illustrates the mechanism of the optical modulation for the reflective mode.

FIG. 6 shows the shutter/pixel design for the case of the reflective mode of the display operation. The design is similar to that shown in FIG. 1, except for the substrate layer structure 56. The enlarged view of the substrate structure is depicted in the right inset to FIG. 6. The substrate is coated first with the continuous light reflective film 57, on top of which an insulating and optically transparent film 58 is deposited, such as $SiO_2$ film. Then, opaque and conductive grating film 59 on top of it is disposed to modulate light according to the present invention. The reflecting film 57 is electrically isolated from the pixel driving circuit and serves only for the light reflection. The top sketch in FIG. 6 illustrates the modulation of the reflected light.

In the reflective mode, as in the transmissive mode of operation, the gray levels can be implemented by driving the display with short pulses during the row addressing time, while sequential, top LED illumination with three major colors will provide the colored image.

In the above discussed twoterminal pixel structure operating in the passive matrix mode, the "on"-state in the pixel remains only during the row addressing time $t_r$ for both transmissive and reflective modes, and more complex, active matrix architecture, is needed to keep the "on"-state for the entire frame time $t_f$ (⅓ of $t_f$ for the color display). Below, another passive matrix approach of the proposed display is discussed which allows one to keep the pixel in the "on"-state during a large fraction of the frame time, thereby significantly increasing the screen brightness. This approach relies on an intrinsic bistability in the switching process of the proposed shutter.

The membrane position in either of the pixel states results from equilibrium of the two forces: the electrostatic force of the membrane-to-substrate attraction $$F_1 = \Delta S \cdot V^2 / 2(L-x)^2, \quad (5)$$

where L is the membrane-to-substrate distance in the unbiased state, x the membrane displacement toward the substrate under the electrostatic force and V is the applied voltage;
and the elastic force $$F_2 = A \cdot x, \quad (6)$$

where A determines the tether beam elasticity. In the equilibrium, $$F_1 = F_2. \quad (7)$$

Figure 7:
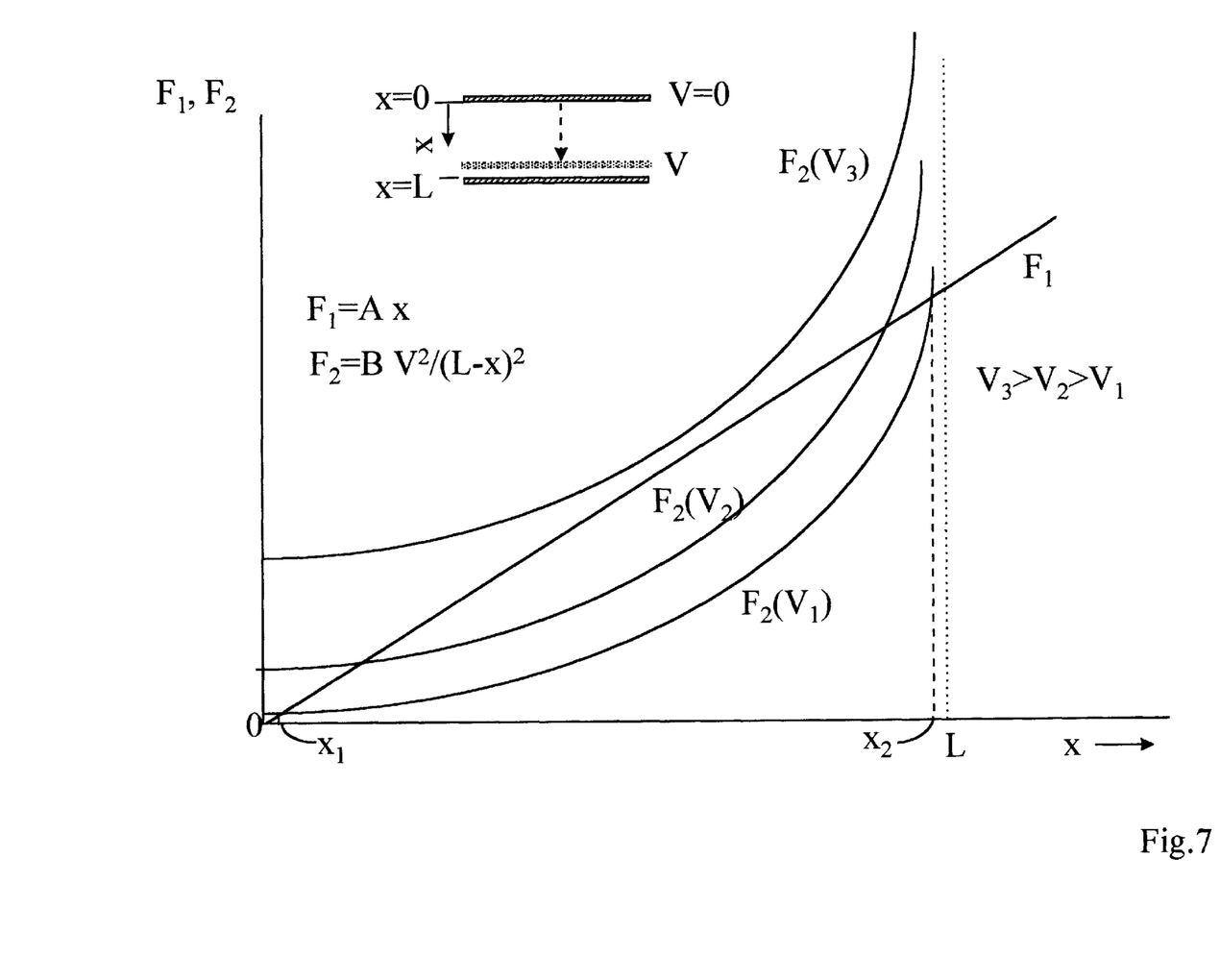
FIG. 7 shows the forces acting upon the membrane to demonstrate the bistability effect.

FIG. 7 illustrates the solutions of the equation (7) for three different possibilities:

1. No stable solution at $V=V_3$. The elastic coefficient A is too small or the voltage $V_3$ is too high to obtain an equilibrium state, and the membrane moves to the final state at x=L.
2. A stable solution at $V=V_2$ for two membrane positions.
3. The same stable solution at low voltage $V=V_1$, in which the membrane positions $x_1$ and $x_2$ are very close to the ultimate states corresponding to x=0 and x=L. The solutions 2. and 3. indicate the existence of the bistability in the system, in which two different, and spatially far apart from each other, membrane positions are energetically favorable. This implies that if the membrane is moved to x=L by an additional external force, a small voltage $V_1$ can support this state indefinitely long. The constant voltage $V_1$ alone moves the membrane to the position at x=1. If however the pulse of the amplitude $V_3$ is simultaneously applied, the membrane switches to the position x=2 and will remain there under the low bias $V_1$ until the voltage is reduced to zero.

Figure 8:
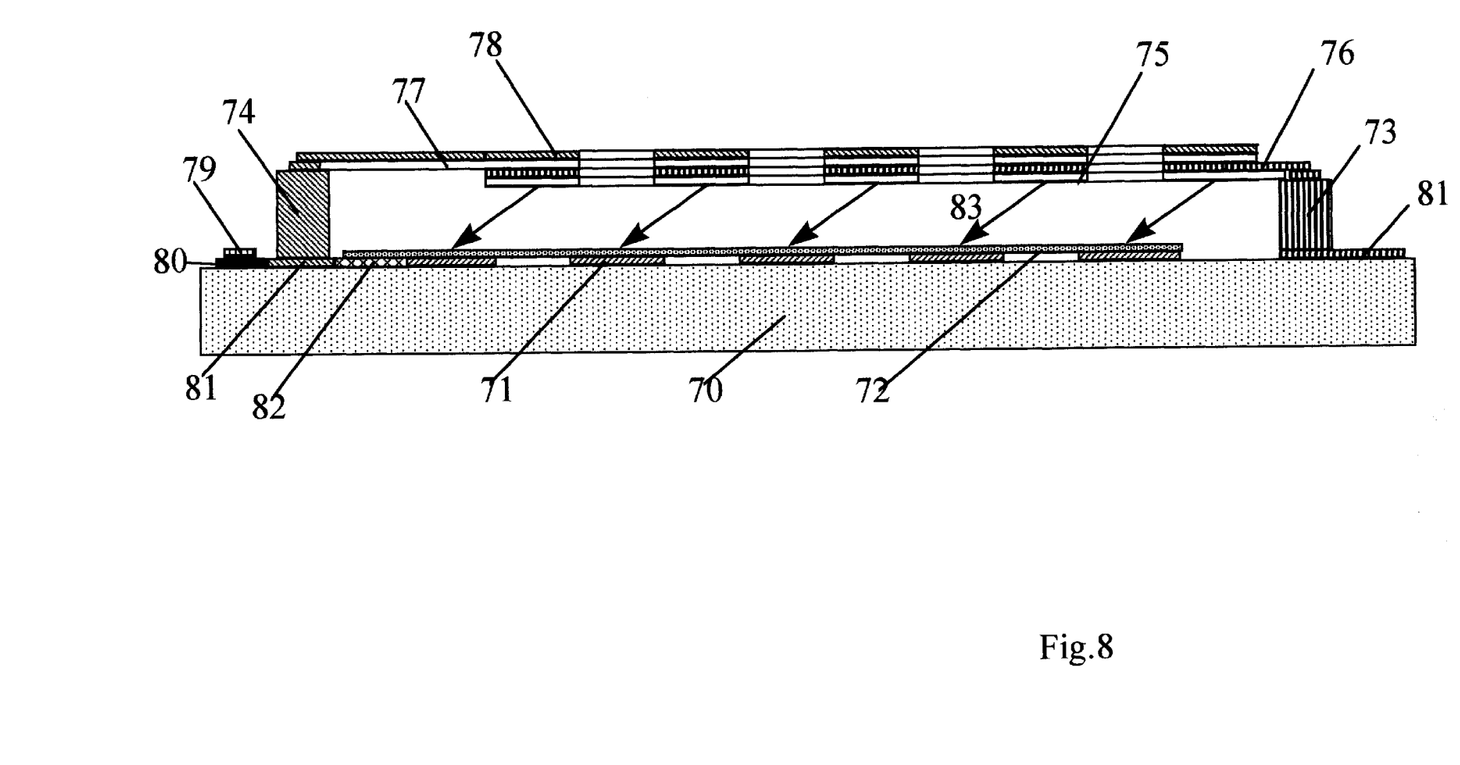
FIG. 8 shows the side view of the pixel structure for the three-terminal configuration.

The effect of bistability provides the possibility for the two-terminal control of the shutter/pixel modulation. To electrically isolate the control circuits, an additional metal grid film, electrically insulated from the original grid film, is deposited on top of the membrane. FIG. 8 shows the new embodiment of the pixel structure. The base metal grid film 71 and insulating film 72 are first grown on the substrate 70. This metal film is connected to the high resistor film 82 and the diode 80 through the metal film 81. The latter is connected to the conductive pillar 74 (left in FIG. 8), which provides the contact to the top membrane grid film 78 through the tether beam (not shown). This film is grown on top of the insulating and optically transparent film 77 (such as $SiO_2$) which contains the openings aligned with those in the original supporting insulating film 75 to reduce the air drag effect. The second grid film 76 is connected through the tether beam to the second conductive pillar 73, and thus provides the second control circuit activated through the contact film 81. As the high voltage of the amplitude $V_3$ is applied to the column line 79, the membrane moves toward the substrate as indicated by the arrows 83. If the constant voltage of the amplitude $V_1$ is simultaneously applied to the contact film 81, the membrane will stay there indefinitely long even after the high voltage $V_3$ is removed, thereby providing a "memory" for "on"-state of the shutter. To return the membrane to the original state at x=0, a small bias of the value $V_1$ and opposite polarity is applied to the column line thereby reducing the total voltage on the membrane to zero. Thus, two pulses of the amplitude $V_3$ and $-V_1$, as well as the constant voltage of the value of $V_1$, provide full control of the shutter pixel modulation.

Figure 9:
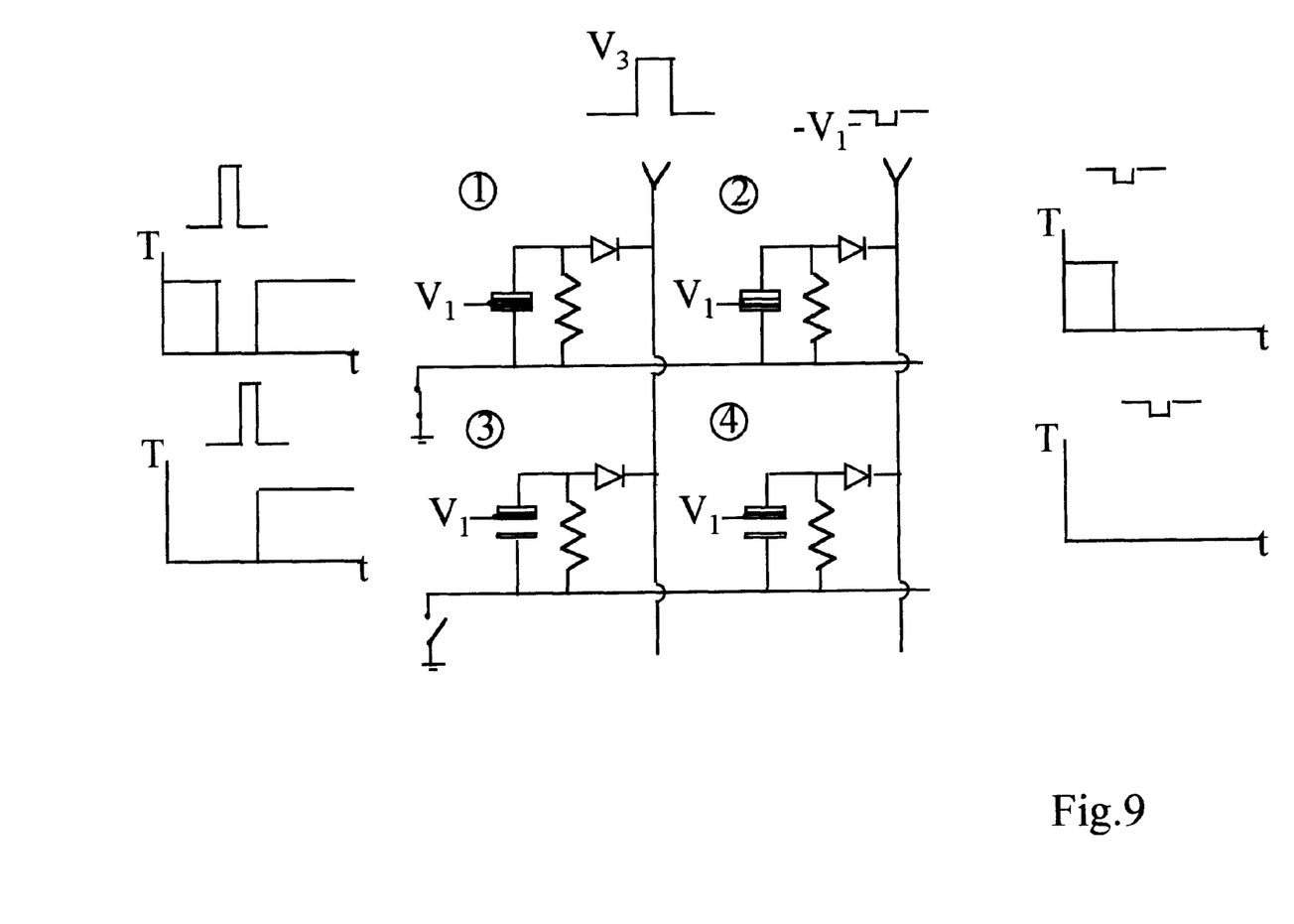
FIG. 9 shows possible combination of electrical signals and optical responses in the three-terminal pixel structure.

The driving scheme of the display operating in the bistable (memory) regime requires; a new driving scheme in which the pixel addressing process precedes the illumination. This delay in illumination is necessary to provide a spatially uniform illumination of the display. FIG. 9 illustrates the display operating in the bistable mode. 4 pixels having different original states and two different column pulses are shown. All pixels contain two contacts to the membrane grating films and one contact to the substrate film, the latter being connected to the row lines which are enabled (grounded) sequentially. For all pixels, the internal membrane film is permanently biased to $V=V_1$, while the external film is connected to the column line. The column lines contain the circuits of the parallel resistor and the diode in series, as in the previous embodiment, shown in FIG. 4.

Before the illumination, according to the new driving scheme, all the pixels are electronically driven into the desired states. For that purpose, two different column pulses of the amplitude $V_3$ and $-V_1$ are applied. Before applying the pulses (i.e. within the previous frame time in the 4 pixel display), the pixels 1 and 2 are assumed to be in the "on"-state, while the pixels 3 and 4 are in the "off"-state. The pulse $V_3$ does not change the "on"-state of the pixel 1 and inverts the state of the pixel 3 from "off"- to "on"-state, while the pulse $-V_1$ transfers the pixel 2 to the "off"-state and leaves the pixel 4 in its original "off"-state. Upon completion of the electronic signal processing, the illumination is then turned on. Resultant kinetics of optical transmission T is shown in the respectful plots for each pixel. These four combinations provide a complete set of operations needed for the display functioning.

Figure 10:
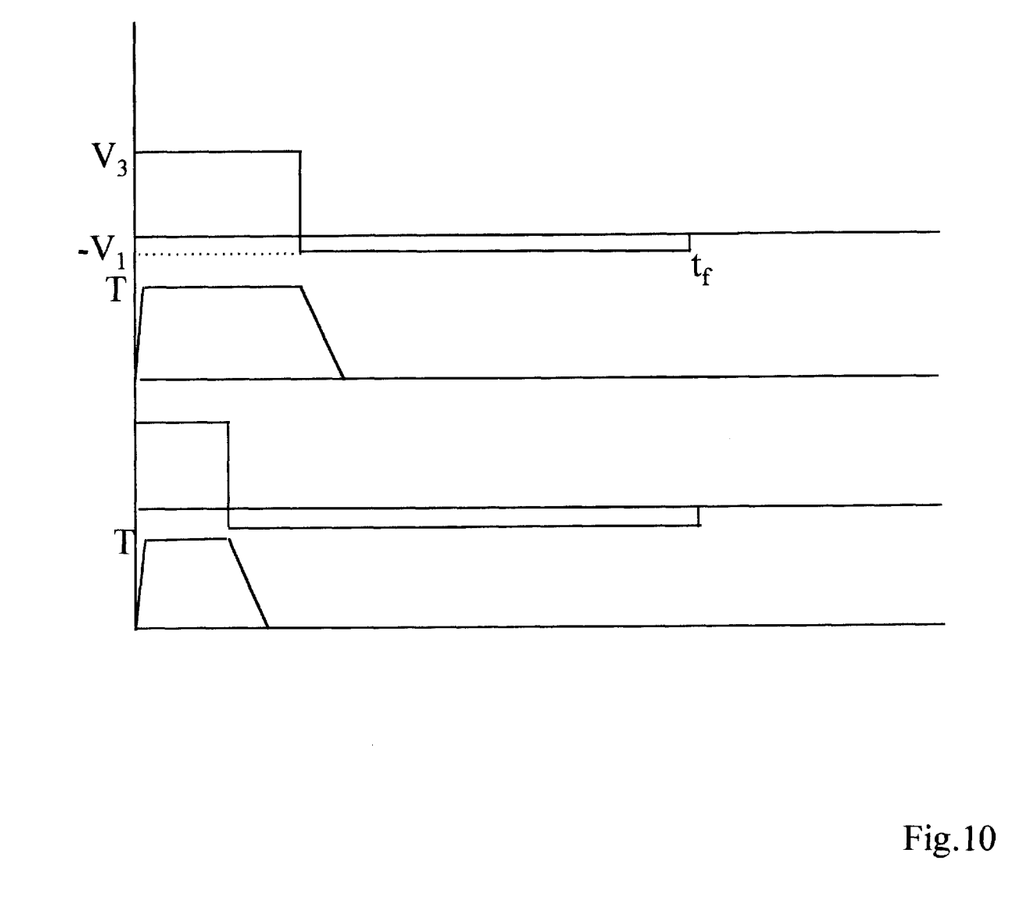
FIG. 10 shows transient characteristics of the optical modulation for the three-terminal pixel structure.

The effect of bistability can be applied for both transmissive and reflective mode of the display operation. To produce the gray levels, the duration of the "on"-state of the pixel is varied within the pixel frame time (per color), as shown in FIG. 10. The voltage pulse $V_3$ transfers the pixel into the "on"-state and then the next pulse of the amplitude $-V_1$ transfers the pixel into the "off"-state, the duration of the first pulse controlling the gray level. The last two kinetic plots are related to a shorter pulse of $V_1$ and correspondingly to a darker gray level than the first two.

Thus, according to the present invention, the proposed flat panel display possesses very attractive features, such as video rate, high resolution, color, multiple gray levels and low operation power, while the fabrication technology is relatively simple and the production cost is expected to be low. While the invention has been particularly shown and described with reference to preferred embodiments thereof, it will be understood by those skilled in the art that changes in form and details may be made therein without departing from the spirit and scope of the present invention For example, a number of preferred materials, grating shutter designs and fabrication processes have been described for the proposed display according to the present invention, but other equivalent materials, designs and processes are also encompassed by the present invention.

What is claimed is:

1. An electrostatic optical shutter having a resilient electrode in the shape of a membrane made from optically transparent and electrically insulating film, wherein said membrane is parallel to and separated by an air gap from an optically transparent and electrically insulating substrate and supported by one flexible tether beam which is attached to said substrate through a conductive pillar; active areas of both said membrane and substrate contain electrically conductive and opaque film in the shape of a grating with periodically repeating opaque stripes, said stripes being connected at one or both ends to form continuous grating electrodes; the substrate continuous grating electrode constitutes first shutter electrode, while the grating electrode on said membrane is connected through the conductive film on said tether beam to said conductive pillar to provide second shutter electrode; said grating electrodes on said substrate and said membrane are shifted from each other by a half a period to block light transmission through the shutter when no voltage is applied between said electrodes and pass the light when appropriate voltage is applied between said grating electrodes, and said membrane is moved to said substrate both normally and laterally, which results in a spatial alignment of said stripes on both said membrane and substrate and formation of openings for light transmission and reflection thereby providing "on"-state of the shutter.

2. The shutter of claim 1, wherein said opaque and electrically conducting stripes in said first and second shutter electrodes are wider than said openings, to provide a complete light blocking in an "off"-state of the shutter in which no voltage is applied and the shutter does not transmit light.

3. The shutter of claim 2, wherein two tether beams support said membrane to enhance its mechanical strength.

4. The shutter of claim 3 wherein an additional grating electrode, aligned with said second shutter electrode, is deposited on top of the membrane and separated from said second shutter electrode with a layer of transparent and insulating material thereby forming third shutter electrode; said third shutter electrode and said second shutter electrode on said membrane are electrically connected through two different tether beams to separate controlling circuits, thereby providing a three-terminal shutter with the memory mode based on a voltage controlled bi-stable membrane positioning relative to the substrate.

5. The shutter of claim 4, in which both insulating films on said membrane are etched away within said openings in said second and third shutter electrodes to minimize air drag.

6. The shutter of claim 5 in which an optically reflective film is deposited first on said substrate, prior to said grating electrode on said substrate, and separated from said grating electrode with an optically transparent and insulating film, to reflect light in said "on"-state of said shutter and thus produce the reflective optical shutter operating in the memory mode.

7. A reflective passive matrix flat panel display operating in a memory mode which comprises: a two-dimensional array of the shutters of claim 6 placed in rows and columns, wherein each shutter is located at the intersection of one column and one row; electrical connections of said first shutter electrodes of said shutters in each row; conducting lines located next to each column of said shutters for formation of column connections; thin-film resistors connected in parallel to each shutter; thin-film diodes connected between said second shutter electrode of each shutter in one column and respective conducting line, thereby forming connections in each column; conductive lines connecting said third shutter electrodes of all shutters in the array; a back panel of light emitting diodes to provide illumination with three main colors; and electronic means to drive the display.

8. A transmissive passive matrix flat panel display operating in the memory mode which comprises: a two-dimensional array of the shutters of claim 5 placed in rows and columns, wherein each shutter is located at the intersection of one column and one row; electrical connections of said first shutter electrodes of said shutters in each row; conducting lines located next to each column of said shutters for formation of column connections; thin-film resistors connected in parallel to each shutter; thin-film diodes connected between said second shutter electrode of each shutter in one column and respective conducting line thereby forming connections in each column; conductive lines connecting said third shutter electrodes of all shutters in the array; a back panel of light emitting diodes to provide illumination with three main colors; and electronic means to drive the display.

9. The display of claim 8, in which color is produced by sequential Illumination during the frame time with three main colors, which are provided by periodic pulsed electroluminescence of light emitting diodes of three different colors.

10. The display of claim 8, in which gray levels are produced by switching the pixel during the frame time to said "on"-state, the duration of said "on"-state controlling the gray level.

11. The shutter of claim 2, wherein small and electrically isolated pillars, shorter than the gap between said membrane and substrate, are deposited on said substrate to protect said membrane from sticking to said substrate in the "on"-state of the shutter in which a voltage is applied between said grating electrodes and said shutter transmits light.

12. The shutter of claim 2, in which the insulating film of said membrane is etched away within said openings in said second shutter electrode to minimize air drag.

13. The shutter of claim 12 in which an optically reflective film is deposited first on said substrate and coated with an optically transparent and insulating film, prior to deposition of a grating film, to reflect light in said "on"-state of the shutter and thus produce a reflective mode of optical modulation.

14. A reflective passive matrix flat panel display which comprises: a two-dimensional array of shutters of claim 13 placed in rows and columns, wherein each shutter is located at the intersection of one column and one row; electrical connections of said first shutter electrodes of said shutters in each row; conducting lines located next to each column of said shutters for formation of column connections; thin-film resistors connected in parallel to each shutter; thin-film diodes connected between said second shutter electrode of each shutter in one column and respective conducting line thereby forming connections in each column; a back panel of light emitting diodes to provide illumination with three main colors; and electronic means to drive the display.

15. A transmissive passive matrix flat panel display which comprises: a two-dimensional array of the shutters of claim 12 placed in rows and columns, wherein each shutter is located at the intersection of one column and one row; electrical connections of said first shutter electrodes of said shutters in each row; conducting lines located next to each column of said shutters for formation of column connections; thin-film resistors connected in parallel to each shutter; thin-film diodes connected between said second shutter electrode of each shutter in one column and respective conducting line thereby forming connections in each column; a back panel of light emitting diodes to provide illumination with three main colors; and electronic means to drive the display.

16. The display of claim 15, in which color is produced by sequential Illumination during a frame time with three main colors, which are provided by a periodic pulsed electroluminescence of light emitting diodes of three different colors.

17. The display of claim 15, in which gray levels are produced by applying within a row addressing time of one or several pulses having duration shorter than the row addressing time.

* * * * *